United States Patent [19]

Aberle

[11] Patent Number: 5,558,187
[45] Date of Patent: Sep. 24, 1996

[54] BRAKE APPARATUS FOR A ROTATING SHAFT

[76] Inventor: David H. Aberle, 5916 Braun Way, Arvada, Colo. 80004

[21] Appl. No.: 486,896

[22] Filed: Jun. 7, 1995

[51] Int. Cl.⁶ ............................................. F16D 57/06
[52] U.S. Cl. ............................... 188/292; 188/294
[58] Field of Search ................................ 188/292, 293, 188/294, 296, 310

[56] References Cited

U.S. PATENT DOCUMENTS

| | | | |
|---|---|---|---|
| 1,770,796 | 7/1930 | Miles | 188/292 |
| 2,786,553 | 3/1957 | Boone et al. | 188/292 |
| 2,933,158 | 4/1960 | Pitts | 188/292 X |

*Primary Examiner*—Josie Ballato

[57] ABSTRACT

A brake apparatus for a rotating shaft. The apparatus comprises a fluid-tight housing in which is disposed a shaft rotational engagement gear having an exteriorly-accessible portion thereof rotatably engageable with a shaft. A plurality of compartments are formed by a plurality of walls within the housing, and the compartments are in fluid communication with each other through openable and closable valves. The housing is substantially filled with a fluid which is flowable through the valves in direct relation to the openness of the valves. A plurality of compartment-divider rotational gears are disposed inside the housing. These compartment-divider gears are rotatably engaged with the shaft rotational gear and are situated in cooperation with the walls forming the compartments to create at their respective sites restriction seals between the compartments. Upon activation, the brake apparatus operates through closure of the valves, thereby retarding the flow of fluid amongst the plurality of compartments and initially increasing fluid pressure. The initially increased fluid pressure slows the gears which, in turn, slow the velocity of a rotating shaft rotatably engaged with the rotational engagement gear and simultaneously gradually decreases fluid pressure.

7 Claims, 1 Drawing Sheet

5,558,187

BRAKE APPARATUS FOR A ROTATING SHAFT

BACKGROUND OF THE INVENTION

This invention relates in general to braking devices, and in particular to a brake apparatus for slowing a rotating shaft such as, for example, the drive shaft of a moving vehicle.

Rotating shafts are associated with concurrent movement of many devices and mechanisms. Important non-limiting examples include transportation vehicles employing drive shafts, axles, and the like, all being associated with vehicle movement. Often, it is important to be able to slow movement in a controlled and timely manner, and such need to retard movement is highly exemplified in motor vehicles whose manufacturers have worked to improve traditional wheel-braking systems by developing disk brakes, ventilated brakes, greater surface areas for braking action, etc. However, as is evident, emphasis has been placed on the rotating wheel rather than on the rotating shafts that deliver power and movement to the rotating wheel. Thus, rotating drive shafts, rotating axle components, etc. generally are ignored as objects in and of themselves for braking action.

It is therefore apparent that a need is present for a brake apparatus that can work independently from traditional brakes to achieve the slowing of a moving object where a rotating shaft carries responsibility for such movement. Accordingly, a primary object of the present invention is to provide a brake apparatus that operates to slow a rotating shaft responsible for delivering power to an operating mechanism.

Another object of the present invention is to provide a brake apparatus for a rotating shaft wherein a component of the brake apparatus is rotationally engaged with the shaft and is rotationally slowable.

Yet another object of the present invention is to provide a brake apparatus for a rotating shaft wherein slowing of the shaft is accomplished through positive and negative fluid pressure.

These and other objects of the present invention will become apparent throughout the description of the invention which now follows.

SUMMARY OF THE INVENTION

The present invention is a brake apparatus for a rotating shaft. The apparatus comprises a fluid-tight housing in which is disposed a shaft rotational engagement means having an exteriorly-accessible portion thereof rotatably engageable with a shaft. A plurality of compartments are formed by a plurality of walls within the housing, and the compartments are in fluid communication with each other through openable and closable valve means. The housing is substantially filled with a fluid which is flowable through the valve means in direct relation to the openness of these valve means. A plurality of compartment-divider rotational engagement means are disposed inside the housing. These compartment-divider rotational engagement means are rotatably engaged with the shaft rotational engagement means to create at adjacent sites restriction seals, and are situated in juxtaposition with the walls forming the compartments to also create at adjacent sites therewith restriction seals which act to separate the compartments. The terms "restriction seal" and "restriction sealing" as used herein are defined as the minimum clearance distance required between two adjacent bodies such that the two bodies can pass by each other without touching.

In a preferred embodiment, the shaft rotational engagement means is a wheel-shape gear having an exteriorly accessible center opening therethrough. The center opening accepts the shaft, while the wheel-shape gear has a rim from which a plurality of cogs project outwardly. These outwardly projecting cogs engage the plurality of compartment-divider rotational engagement means which, themselves, are preferably wheel-shape gears having respective rims from which a plurality of cogs project outwardly for such engagement. The shaft is secured to the shaft rotational engagement means with a conventional spline device.

Upon activation, the brake apparatus of the present invention operates through closure of the plurality of valve means, thereby retarding the flow of fluid amongst the plurality of compartments. Because the compartment-divider rotational engagement means create at their respective sites restriction seals between the compartments, their rotation rate decreases as the fluid flow rate decreases and positive and negative pressure within the compartments initially increases and then gradually decreases with the slowing of the shaft. Since these compartment-divider rotational engagement means are in engagement with the shaft rotational engagement means, the rotation rate of the shaft rotational engagement means likewise decreases. Therefore, because this shaft rotational engagement means is in rotational communication with the rotating shaft, the rotation rate of the shaft is decreased, and braking action is thereby provided. As is evident, continued closure action on the valves continually decreases the flow rate of fluid which continually decreases the rotation rate of the shaft. In this manner, rotational braking of a shaft occurs independently of any other braking system such as that which may be employed for a mechanism energized through the rotational movement of the shaft being so braked. When so used as an adjunct braking apparatus, resultant rotational braking can greatly enhance a conventional braking system traditionally in place.

BRIEF DESCRIPTION OF THE DRAWINGS

An illustrative and presently preferred embodiment of the invention is shown in the accompanying drawings in which.

DETAILED DESCRIPTION OF A PREFERRED EMBODIMENT

Figure 1:
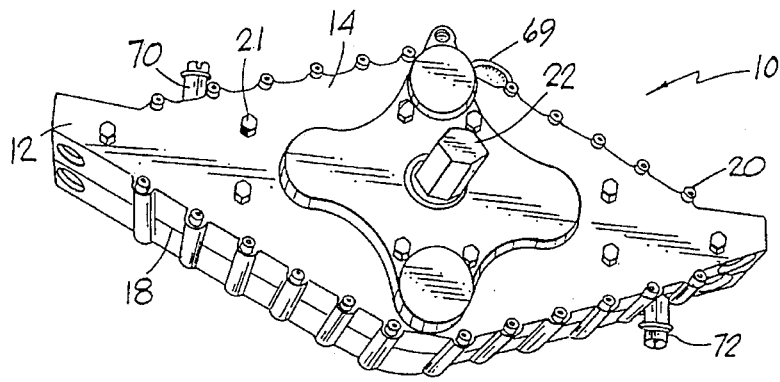
FIG. 1 is a front perspective view of a brake apparatus for a rotating shaft.
Figure 2:
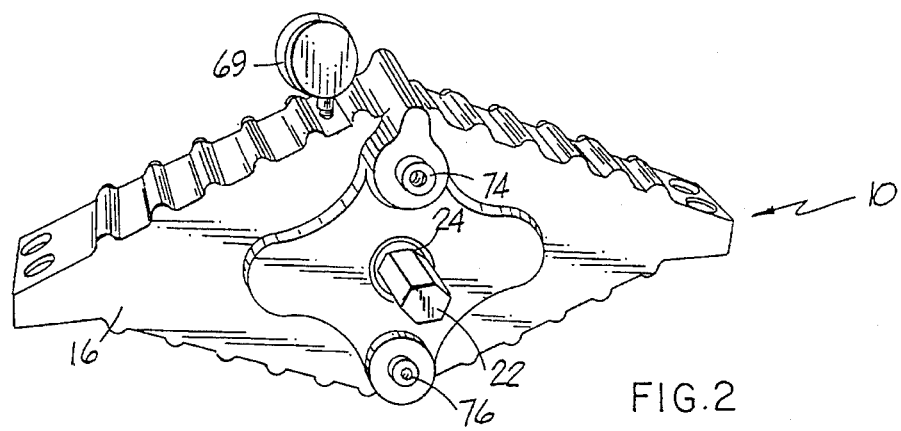
FIG. 2 is a rear perspective view of the apparatus of FIG. 1.

Referring to FIGS. 1 and 2, a brake apparatus 10 is illustrated. The apparatus 10 has an outer fluid-tight housing 12 constructed of a front casing member 14 and a rear casing member 16 held together at a mating periphery site 18 with a plurality of screws 20 through aligned threaded openings, as well as at aligned threaded openings at interfacing interior wall top edges, described below, with a plurality of screws 21. A rotatable shaft 22 is shown running through the center of the apparatus 10 through an exteriorly accessible opening 24. This rotatable shaft 22 can be associated with any mechanism to which it transmits resulting rotational power, with a primary example of the shaft 22 being a drive shaft of a vehicle (not shown). In that instance, the drive shaft transmits rotational power to an axle which in turn rotates wheels and moves the vehicle. The housing 12 is here constructed of aluminum, with each of the front and rear casing members 14, 16 matched to provide sealingly-close internal tolerances whose importance will become apparent below.

Figure 3:
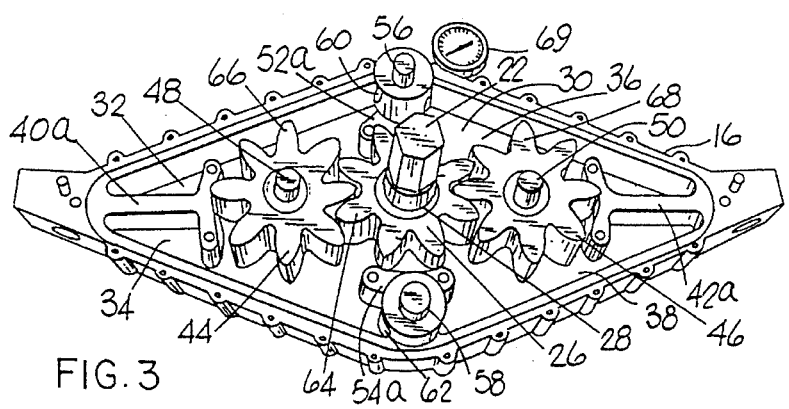
FIG. 3 is a front perspective view of the apparatus of FIG. 1 with the front casing thereof removed.
Figure 4:
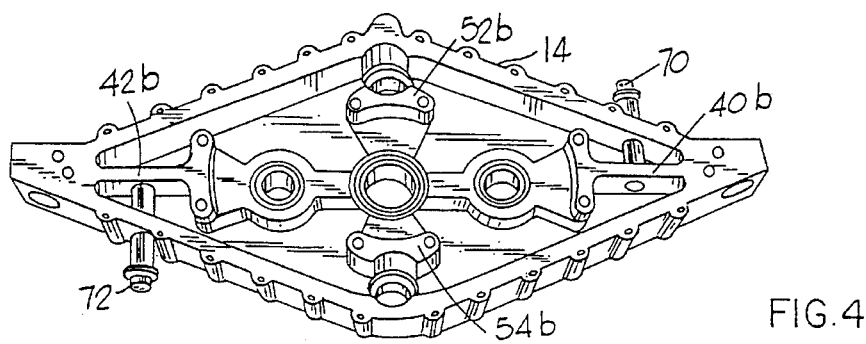
FIG. 4 is a perspective view of the interior of the front casing.

Referring to FIG. 3, wherein the front casing member 14 is removed, a shaft rotational engagement means here being a bearing-mounted wheel-shape central gear 26 having an exteriorly accessible center opening 28 in spline rotatable engagement as known in the art with the rotatable shaft 22 is shown. The interior cavity 30 is divided into four compartments 32, 34, 36, 38, with the compartments 32, 34 divided from each other by T-shaped wall 40a. In like manner, the compartments 36, 38 are divided from each other by T-shaped wall 42a. Further division of the compartments 32, 34, 36, 38 from each other is accomplished by respective compartment-divider rotational engagement means here being respective wheel-shape divider gears 44, 46 rotatably bearing-mounted on respective spindles 48, 50. Respective valve-housing base walls 52a, 54a of respective valves 56, 58 complete division of the compartments 32, 34, 36, 38. As shown in FIG. 4, the interior of the front casing 14 has complimentary respective walls 40b and 42b whose top edges seal with the top edges of walls 40a and 42a when the casing 14 is in place. In a similar manner the front casing 14 has therein complimentarily-shaped valve-housing base walls 52b, 54b whose top edges seal with the top edges of base walls 52a, 54a when the casing 14 is in place.

As is apparent in FIG. 3, the central gear 26 has a plurality of cogs 64 projecting outwardly from its rim. The divider gears 44, 46 are constructed substantially identically to the central gear 26 and therefore likewise have respective pluralities of cogs 66, 68 projecting outwardly from their respective rims. All gears 26, 44, 46 in the preferred embodiment are constructed of bronze. The gears 26, 44, 46 are arranged such that they engage with adjacent gears. Simultaneously, the tips of the respective cogs 66, 68 almost contact adjacent tops of the T-shaped walls 40a, 42a to thereby produce restriction sealing, while the tips of the cogs 64 almost contact the valve-housing base walls 52a, 54a to also produce restriction sealing. Of course, when the front casing 14 is in place, the tips of the respective cogs 66, 68 almost contact adjacent tops of the T-shaped walls 40b, 42b to likewise produce restriction sealing, while the tips of the cogs 64 almost contact the valve-housing base walls 52b, 54b to also produce restriction sealing.

In operation, the brake apparatus 10 is filled with a fluid such as oil, and is situated such that a rotatable shaft 22 resides via spline connection through the center of the apparatus 10 as shown. As shown in FIG. 3, bearing-mounted valves 56, 58 each have therethrough respective openings 60, 62 through which the oil can flow when the valves 56, 58 are in an open position. Operation of the valves 56, 58 is directed by a user through employment of any control mechanisms such as a solenoid switch or any other appropriate means as recognizable by a skilled artisan and working in combination with respective valve shafts 74, 76 extending from the housing 12 to rotate the valves 56, 58 between open and closed positions. Thus, when the valves 56, 58 are open, the oil can move freely among the compartments 32, 34, 36, 38. When the rotatable shaft 22 is rotating and the valves 56, 58 are open, shaft rotation is unimpeded. A conventional pressure gauge 69 can be included to monitor pressure within the housing 12. Also included in the preferred embodiment are two conventional spring-and-ball pressure bypass relief valves 70, 72 shown in FIGS. 1 and 4 for releasing to the exterior any untoward pressure build-up within the housing 12. When an operator wishes to slow the rotating shaft 22, the operator closes the valves 56, 58 by rotating them 90° for complete closure or less for incomplete closure. Such action causes oil pressure build up because the oil can no longer flow freely among the compartments 32, 34, 36, 38. This increased pressure build up causes the gears 26, 44, 46 to slow. As the gears 26, 44, 46 slow down because of pressure build up, rotational velocity of the rotating shaft 22 also slows, thus producing a braking action on the shaft 22 and consequently on any mechanism powered by the rotational velocity of the shaft 22. As the gears 26, 44, 46 slow, pressure within the housing 12 decreases to thereafter allow the shaft 22 to rotate more freely at its new reduced speed. This pressure reduction because of shaft slowing and consequent freeing of shaft rotation provides anti-lock braking characteristics for the shaft 22. In this manner a braking action is effectively applied on a rotating shaft responsible for delivering rotational power to another mechanism such that consequent braking action occurs on that other mechanism.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

I claim:

1. A brake apparatus for a rotating rotatable shaft, the apparatus comprising:

a) a fluid-tight housing;

b) a shaft rotational engagement means disposed within the housing and having an exteriorly-accessible opening therethrough for rotatable engagement with a rotatable shaft;

c) a plurality of walls within the housing forming a plurality of compartments within the housing, with said compartments in fluid communication with each other through openable and closable valve means;

d) a liquid permanently within the housing present in an amount to substantially fill the housing and flowable through the valve means in direct relation to the openness of said valve means; and e) a plurality of compartment-divider rotational engagement means disposed inside the housing, said compartment-divider rotational engagement means rotatably restriction-sealingly engaged at respective engagement sites with the shaft rotational engagement means and situated in juxtaposition with the walls forming the compartments to produce respective restriction seals therewith.

2. A brake apparatus as claimed in claim 1 wherein the shaft rotational engagement means is a wheel-shape gear having an exteriorly accessible center opening therethrough, and wherein said wheel-shape gear has a rim from which a plurality of cogs project outwardly and engage with the plurality of compartment-divider rotational engagement means.

3. A brake apparatus as claimed in claim 2 wherein each compartment-divider rotational engagement means comprises a wheel-shape gear having a rim from which a plurality of cogs project outwardly such that the compartment-divider rotational engagement means rotationally engage the shaft rotational engagement means.

4. A brake apparatus as claimed in claim 3 wherein the fluid is a liquid.

5. A method for slowing a rotating rotatable shaft, the method comprising:
 a) providing a brake apparatus for the shaft, the apparatus comprising
  a fluid-tight housing,
  a shaft rotational engagement means disposed within the housing and having an exteriorly-accessible opening therethrough for rotatable engagement with the shaft,
  a plurality of walls within the housing forming a plurality of compartments within the housing, with said compartments in fluid communication with each other through openable and closable valve means,
  a liquid permanently within the housing present in an amount to substantially fill the housing and flowable through the valve means in direct relation to the openness of said valve means, and
  a plurality of compartment-divider rotational engagement means disposed inside the housing, said compartment-divider rotational engagement means rotatably restriction-sealingly engaged at respective engagement sites with the shaft rotational engagement means and situated in juxtaposition with the walls forming the compartments to produce respective restriction seals therewith;
 b) engaging the rotatable shaft with the exteriorly-accessible portion of the shaft rotational engagement means;
 c) positioning the valve means in an open position and rotating the shaft; and
 d) activating the brake apparatus when the rotatable shaft is rotating by closing the valve means.

6. A method as claimed in claim 5 wherein the shaft rotational engagement means of the brake apparatus is a wheel-shape gear having an exteriorly accessible center opening therethrough, with said center opening rotatably engageable with a rotatable shaft, and wherein said wheel-shape gear has a rim from which a plurality of cogs project outwardly and engage with the plurality of compartment-divider rotational engagement means.

7. A method as claimed in claim 6 wherein each compartment-divider rotational engagement means of the brake apparatus comprises a wheel-shape gear having a rim from which a plurality of cogs project outwardly such that the compartment-divider rotational engagement means rotationally engage the shaft rotational engagement means.

* * * * *